United States Patent
Sudorzhenko

(10) Patent No.: US 12,536,328 B1
(45) Date of Patent: Jan. 27, 2026

(54) PRIVACY-GATED DECENTRALIZED MULTI-AGENT ARTIFICIAL INTELLIGENCE ARCHITECTURE

(71) Applicant: Alona Sudorzhenko, Westlake Village, CA (US)

(72) Inventor: Alona Sudorzhenko, Westlake Village, CA (US)

( * ) Notice: Subject to any disclaimer, the term of this patent is extended or adjusted under 35 U.S.C. 154(b) by 0 days.

(21) Appl. No.: 19/189,290

(22) Filed: Apr. 25, 2025

(51) Int. Cl.
| | |
|---|---|
| *G06F 21/62* | (2013.01) |
| *H04L 9/40* | (2022.01) |
| *H04L 67/55* | (2022.01) |
| *H04M 3/42* | (2006.01) |

(52) U.S. Cl.
CPC ...... *G06F 21/6245* (2013.01); *H04L 63/0407* (2013.01); *H04L 63/0421* (2013.01); *H04L 67/55* (2022.05); *H04M 3/42008* (2013.01); H04L 2209/42 (2013.01)

(58) Field of Classification Search
CPC .......... G06F 21/6245; H04L 63/0407; H04L 63/0421; H04L 67/55; H04L 2209/42; H04M 3/42008
See application file for complete search history.

(56) References Cited

U.S. PATENT DOCUMENTS

| | | | | |
|---|---|---|---|---|
| 9,672,497 | B1 * | 6/2017 | Lewis .................. | G06F 40/284 |
| 2002/0016910 | A1 * | 2/2002 | Wright .................. | H04L 67/34 |
| | | | | 713/150 |
| 2002/0156693 | A1 * | 10/2002 | Stewart ................. | G06Q 10/06 |
| | | | | 709/204 |
| 2012/0005219 | A1 * | 1/2012 | Apacible ............... | G06F 16/334 |
| | | | | 707/768 |
| 2015/0254555 | A1 * | 9/2015 | Williams, Jr. ......... | G06N 3/045 |
| | | | | 706/14 |
| 2021/0110057 | A1 * | 4/2021 | Lamba ................. | G06F 21/6245 |
| 2022/0245278 | A1 * | 8/2022 | Navarro-Dimm .... | G06F 40/174 |
| 2022/0278967 | A1 * | 9/2022 | Glassco ............... | H04W 12/033 |

(Continued)

*Primary Examiner* — David J Pearson
*Assistant Examiner* — Nega Woldemariam

(57) ABSTRACT

A privacy-preserving, industry-agnostic artificial intelligence architecture is disclosed. The architecture features a Conversation Hub receiving end-user messages, performing lightweight natural language processing, removing personally identifiable information (PII), securely storing permissible user profile data, and publishing anonymized envelopes onto a decentralized message bus. Independent, stateless Domain Expert Pods, each representing specialized knowledge domains, autonomously subscribe to the bus and determine message relevance. Pods requiring additional user information issue structured requests relayed securely to users by the Conversation Hub. Updated user responses enrich profile data and trigger rebroadcasts. Relevant Domain Expert Pods generate domain-specific responses evaluated by Compliance Pod sidecars enforcing tenant-specific regulatory and policy constraints. Compliance-approved responses are emitted directly onto a client-visible channel, enabling parallel multi-domain expert interactions. Eliminating central orchestration, the architecture provides decentralized expertise selection, adaptive personalization, robust privacy enforcement, and hot-swappable compliance, significantly simplifying integration and enabling rapid policy modifications without altering core logic.

21 Claims, 12 Drawing Sheets

(56) References Cited

U.S. PATENT DOCUMENTS

| | | | |
|---|---|---|---|
| 2023/0124967 A1* | 4/2023 | Kelesis | G06F 21/6218 |
| | | | 701/3 |
| 2024/0073290 A1* | 2/2024 | Srinivasan | H04L 9/3213 |
| 2025/0061186 A1* | 2/2025 | Sharma | H04L 9/3247 |
| 2025/0173603 A1* | 5/2025 | Edwards | G06N 20/00 |
| 2025/0190460 A1* | 6/2025 | Madisetti | G06F 40/30 |

* cited by examiner

PRIVACY-GATED DECENTRALIZED MULTI-AGENT ARTIFICIAL INTELLIGENCE ARCHITECTURE

DESCRIPTION OF RELATED ART

PA-1: ASAPP Inc., U.S. Pat. No. 10,169,315 B1 ("Neural-network PII redaction"), filed Mar. 16, 2016, and issued Jan. 1, 2019.
  Core Teaching: Employs a sequential neural network to detect and mask personal data within text streams.
  Distinguishing Features: The present invention emphasizes architectural novelty through a privacy gateway and anonymized message envelopes isolating personally identifiable information (PII) before expert pod distribution. PA-1 does not address decentralized topology or agent distribution.

PA-2: Accenture plc, U.S. Patent Publication No. 2025/0068741 A1 ("Dual risk-scoring compliance filter for LLMs"), filed Oct. 2, 2023, published Mar. 6, 2025.
  Core Teaching: Dual-input/output risk scoring around a monolithic large language model (LLM) for content filtering.
  Distinguishing Features: The present invention employs compliance pods as independent side-cars, event-driven decentralized topology, and hot-swappable compliance rules via YAML files, distinct from Accenture's centralized dual-risk model.

PA-3: IBM, U.S. Pat. No. 9,892,374 B2 ("AI task orchestrator with central router"), filed Aug. 14, 2015, and issued Feb. 13, 2018.
  Core Teaching: Central orchestrator assigns sub-tasks to worker agents via remote procedure calls (RPCs).
  Distinguishing Features: The present invention removes the central orchestrator, allowing domain experts to autonomously self-select tasks from anonymized envelopes broadcast via a message-bus architecture, thus removing single points of failure and bottlenecks.

PA-4: C3.ai, U.S. Patent Publication No. 2021/0123456 ("Enterprise orchestrator agent"), filed Sep. 30, 2019, published Apr. 29, 2021.
  Core Teaching: Workflow engine selects AI models based on metadata and aggregates results centrally.
  Distinguishing Features: The present invention coordinates via optional merit-ledger tracking and token-based sequencing over decentralized publish-subscribe channels, rather than centralized scheduling or aggregation.

PA-5: Google LLC, U.S. Patent Publication No. 2020/0345678 ("Federated model training system"), filed May 22, 2018, published Nov. 5, 2020.
  Core Teaching: Federated learning where local devices train model weights independently, and a central server aggregates these weights.
  Distinguishing Features: The present invention addresses decentralized inference and compliance-controlled knowledge distribution through anonymized envelopes, not federated learning or model-weight aggregation.

PA-6: Microsoft Corporation, WO Publication No. 2024/089012 ("Context retrieval for language models"), filed Oct. 15, 2022, published Apr. 25, 2024.
  Core Teaching: Retrieval of context information from vector indexes for monolithic large language models.
  Distinguishing Features: Retrieval occurs independently within each expert pod, with outputs independently validated via compliance side-cars, eliminating reliance on a single monolithic model.

PA-7: OpenAI, GPT-4 System Card Whitepaper (March 2023).
  Core Teaching: Policy layering and red-teaming around a frontier language model.
  Distinguishing Features: The present invention introduces decentralized architecture, event-driven expert pod self-selection from anonymized envelopes, and runtime hot-swappable tenant-specific policy rules, none disclosed by OpenAI.

PA-8: SRI International, U.S. Pat. No. 6,851,115 B1 ("Software-based architecture for communication and cooperation among distributed electronic agents"), issued Feb. 1, 2005.
  Core Teaching: Describes Open A gent Architecture (OAA) with a facilitator agent brokering requests among distributed intelligent agents that advertise their capabilities.
  Distinguishing Features: OAA relies on a central facilitator and does not include decentralized publish-subscribe message buses or distributed compliance enforcement, both core elements of the present invention.

PA-9: Ramachandran et al., U.S. Patent Publication No. 2002/0107826 A1 ("Multi-agent collaborative architecture for problem solving and tutoring"), published Aug. 8, 2002.
  Core Teaching: Architecture with multiple domain-dependent agents communicating via dedicated per-agent blackboards, controlled by a token-passing mechanism ensuring sequential agent operation.
  Distinguishing Features: Present invention uses a unified publish-subscribe bus enabling parallel operation and incorporates distributed compliance enforcement, differing significantly from Ramachandran's token-based, blackboard-controlled system.

PA-10: Jammes et al., U.S. Patent Publication No. 2012/0029656 A1 ("Method for developing a multi-agent system"), published Feb. 2, 2012.
  Core Teaching: Service-oriented multi-agent system using Devices Profile for Web Services (DPWS) with publish-subscribe eventing for asynchronous agent messaging.
  Distinguishing Features: Focused primarily on device-level service interactions rather than domain-specific AI. It does not incorporate compliance monitoring or cognitive agent coordination on a high-level messaging bus as presented in the current invention.

PA-11: Persais LLC, U.S. Pat. No. 9,729,592 B2 ("System and method for distributed virtual assistant platforms"), issued Aug. 8, 2017.
  Core Teaching: Distributed virtual assistants using a central orchestration service to delegate tasks to specialized agents within a middleware framework.
  Distinguishing Features: Present invention eliminates static orchestration; agents autonomously self-select tasks through a publish-subscribe message bus and compliance is enforced independently by dedicated side-cars, features absent in Persais's approach.

PA-12: Uszok et al., "KAOS Policy and Domain Services," IEEE Policy Conference (2003).
  Core Teaching: Framework governing distributed agents through declarative runtime-enforced policies and domain structures, using a centralized policy decision point to ensure agent compliance.
  Distinguishing Features: KA OS enforces compliance centrally and does not incorporate decentralized task selection or publish-subscribe messaging architectures. The present invention combines decentralized message-bus coordination with per-agent runtime compliance enforcement, absent in KAoS.

BACKGROUND OF THE INVENTION

Large Language Model (LLM) services and conversational chatbots have increasingly been integrated into fields such as finance, healthcare, legal practice, and other knowledge-intensive industries. Most current implementations utilize a centralized orchestration architecture, where an ingress component receives a user's message and subsequently forwards it to either a monolithic LLM or a hierarchy of specialized sub-agents. The orchestrator then returns a synthesized, unified response to the user. While straightforward, this centralized architectural approach introduces several significant challenges.

First, centralized orchestrators inherently pose privacy and data residency risks. Such orchestrators typically inspect and may retain personally identifiable information (PII) to facilitate appropriate routing and tailoring of user requests. Consequently, each downstream component indirectly gains access to potentially sensitive data, complicating adherence to stringent data protection regulations such as GDPR, HIPAA, GLBA, and PCI DSS.

Second, the centralized architecture enforces rigid, tenant-specific compliance mechanisms. Centralized prompts or orchestrators must embed institution-specific policies, disclaimers, or jurisdictional rules directly. Therefore, modifying a single compliance rule-such as updating regulatory limits or introducing new policy exclusions-requires altering the central orchestrator or redeploying core components. This process increases downtime risks and may introduce regression errors.

Third, the centralized approach creates a scalability bottleneck related to the integration and management of expert knowledge domains. Routing rules within hierarchical agent frameworks require manual updates when incorporating additional domain-specific expertise. Each new domain or change necessitates adjustments to centralized routing logic, synchronized updates across sub-agents, and potentially significant retraining efforts. This architectural rigidity hampers efficient scalability as the scope of expertise expands.

Finally, centralized synthesis of information limits transparency and auditability. By merging multiple sources of domain-specific knowledge into a single synthesized response before compliance checks, auditors face challenges in accurately tracing the provenance of individual components within the generated output. This opacity complicates verification processes and regulatory auditing requirements. Accordingly, there exists a need for a decentralized, event-driven multi-agent architecture that addresses these challenges. The desired system should confine sensitive information to a single, auditable gateway, empowering downstream agents to independently determine message relevance without direct exposure to raw PII. The architecture should facilitate the seamless addition or removal of domain-specific experts without necessitating modifications to central routing logic. Additionally, it should support tenant-specific compliance policies applied dynamically at the domain-agent level and ensure transparent provenance tracking for comprehensive regulatory auditing.

SUMMARY OF THE INVENTION

The invention provides a decentralized, privacy-gated, multi-agent artificial intelligence architecture capable of delivering domain-specific reasoning and compliance-driven outputs without dependency on a central orchestrating component. User messages initially enter the system through a Conversation Hub, which performs lightweight natural language processing, removes or hashes personally identifiable information (PII), securely commits allowable user profile data to a protected data repository, and subsequently republishes an anonymized message envelope onto a shared message bus.

A federation of stateless, domain-specific expert agents—each specialized in knowledge areas—subscribes independently to this message channel. Each agent autonomously assesses message relevance based upon its domain specialization. If an expert agent determines it lacks necessary user profile data, it generates a structured data request via a secondary communication channel. The Conversation Hub receives this request, relays it to the user, securely stores the user's reply, and republishes an updated anonymized envelope. This mechanism closes data gaps effectively without distributing PII downstream.

Upon obtaining sufficient information, each relevant expert agent formulates a preliminary response utilizing retrieval-augmented generation techniques, rule-based logic, or comparable reasoning methodologies. Prior to delivery to the user, each response is routed through an individually paired compliance module ("compliance sidecar") that dynamically applies tenant-specific policy requirements configured through a modular, easily replaceable compliance framework. Responses that fulfill these compliance criteria are then directly transmitted to a client-facing channel, facilitating parallel and independent interactions between the user and multiple domain agents, each possessing its own unique persona and citation standards.

Since expert agents autonomously determine relevance and compliance validation occurs modularly at each domain-specific level, new knowledge domains, additional tenants, or evolving regulatory requirements can be seamlessly integrated without necessitating modifications to the central Conversation Hub or redeployment of existing agent infrastructure. Consequently, the proposed architecture concurrently achieves four primary objectives: effective confinement of PII, decentralized determination of expertise relevance, dynamically updatable compliance enforcement, and comprehensive auditability of data and decision-making processes, essential for regulated advisory environments.

TECHNICAL FIELD OF THE INVENTION

The invention relates generally to the field of distributed artificial intelligence systems and, more specifically, to decentralized, event-driven multi-agent computing architectures capable of providing domain-specific reasoning while ensuring data privacy and regulatory compliance. The invention includes components and methodologies related to message-oriented communication, natural language processing techniques, contextually enriched reasoning engines, dynamically configurable compliance enforcement, and secure management of sensitive user information. Potential applications span various regulated domains, including, but not limited to, finance, healthcare, legal practice, and other advisory or knowledge-intensive sectors requiring stringent privacy and compliance controls.

DETAILED DESCRIPTION OF THE INVENTION

Figure 1:
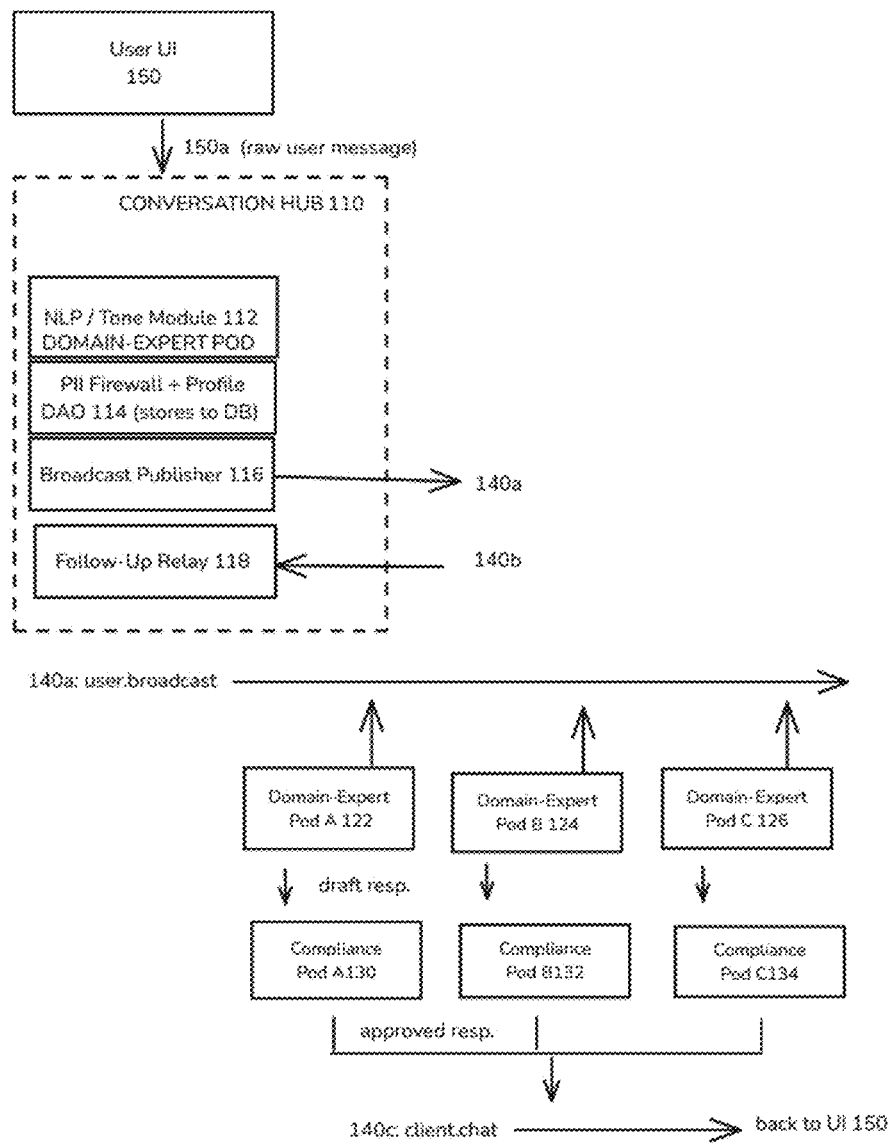
FIG. 1 is a block diagram illustrating a privacy-gated, decentralized multi-agent artificial intelligence architecture comprising self-selecting domain expert pods and modular compliance sidecars, according to an embodiment of the invention.

Throughout this specification, identical reference numerals denote identical or functionally equivalent elements. Descriptions referencing specific domains or industries serve only illustrative purposes. As will become evident, the described architecture is inherently industry-agnostic, broadly applicable, and readily adaptable to diverse regulated sectors such as, but not limited to, financial services, healthcare, cybersecurity, human resources, logistics, legal services, government compliance, and education.

The invention described herein presents a decentralized, privacy-preserving multi-agent artificial intelligence architecture uniquely designed to deliver expert-level advisory services without reliance on centralized orchestration, thereby significantly enhancing privacy, compliance, efficiency, and scalability beyond conventional systems. By eliminating a centralized routing component or monolithic moderation layer, this architecture provides distinct non-obvious improvements to latency, scalability, compliance modularity, and data protection.

Figure 12:
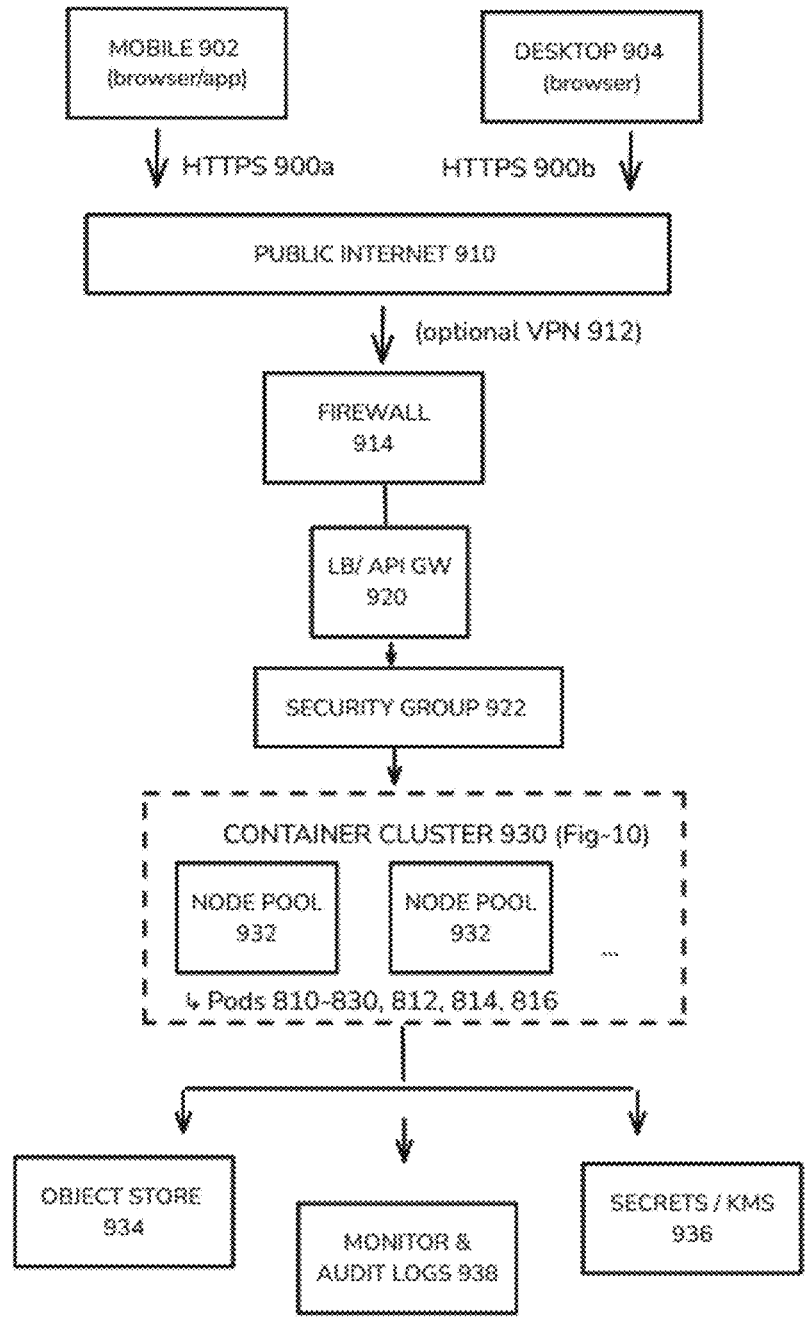
FIG. 12 is a diagram of an exemplary computing environment comprising client devices, a server cluster, a message bus, and a vector datastore, suitable for implementing the described architecture.

Initially, a user begins an interaction session using an end-user computing device (e.g., mobile device 902 or desktop client 904, FIG. 12). Communication occurs securely via HTTPS channels (900a, 900b), traversing standard internet infrastructure (910) and optionally secured by enterprise VPN tunnels (912). Requests then sequentially pass through an edge firewall (914), cloud-based load balancer or API gateway (920), and an inbound security group (922), ultimately entering the container orchestration cluster (930).

Figure 10:
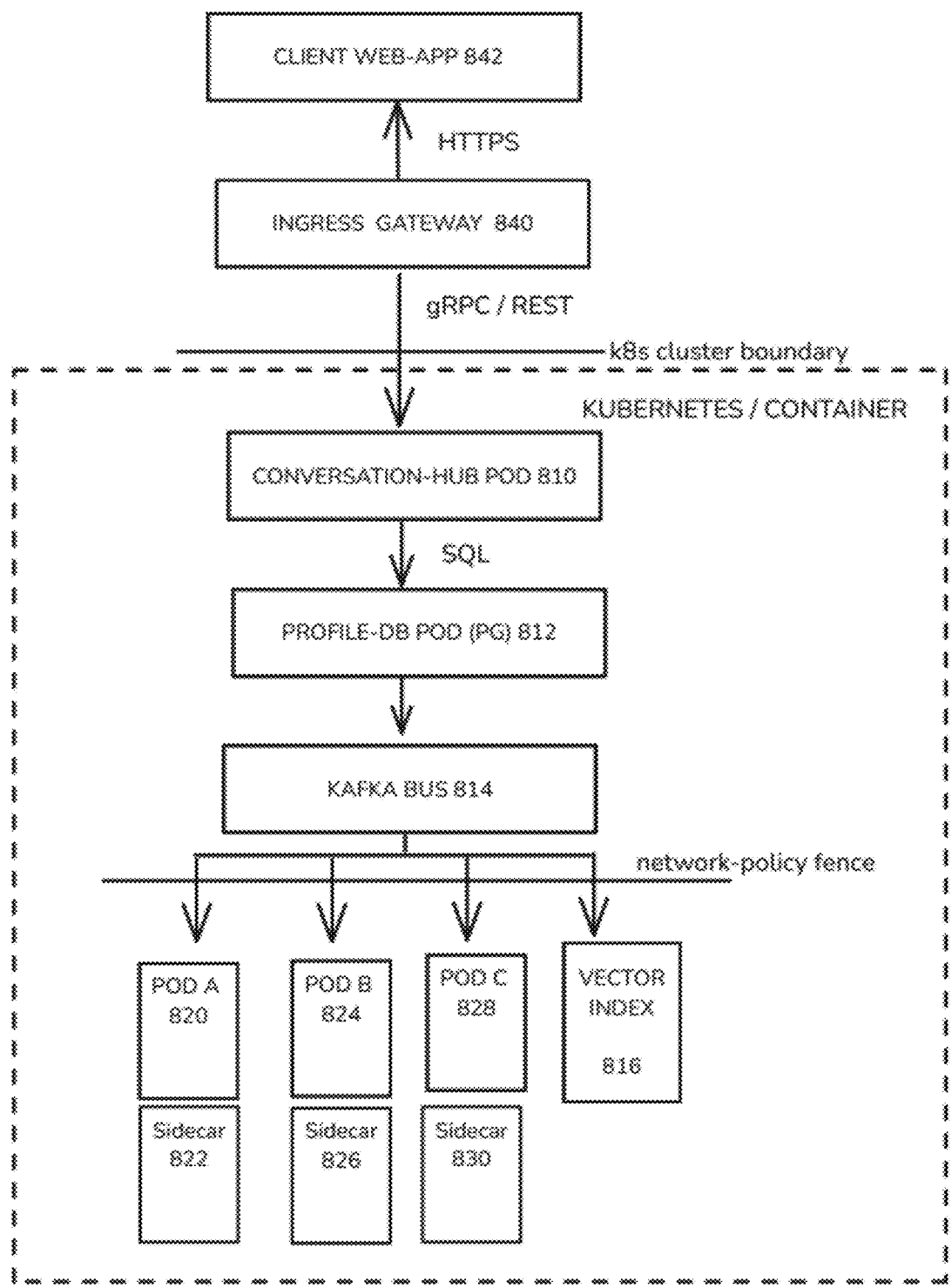
FIG. 10 is a container-level deployment diagram illustrating the isolation and message bus interconnections among the Conversation Hub, domain expert pods, compliance pods, and related supporting services.

Inside this cluster, requests arrive at a Conversation Hub (110, FIGS. 1 & 10). The Conversation Hub performs critical privacy-preserving preprocessing through a PII Redaction Firewall (114, FIG. 5). The firewall comprises three primary components: an Identifier Detector (114a), Hash Generator (114b), and Profile Writer (114c). Specifically, Identifier Detector (114a) leverages advanced named-entity recognition, regular expressions, or equivalent state-of-the-art detection techniques to locate personally identifiable information such as names, social security numbers, financial account numbers, or medical identifiers. These direct identifiers are immediately replaced by salted, deterministic hashes via the Hash Generator (114b). Original identifiers are subsequently discarded to prevent downstream exposure, thus rigorously upholding privacy standards mandated by GDPR, HIPAA, GLBA, and similar regulatory frameworks.

The Profile Writer (114c) securely persists approved, non-sensitive user profile attributes-such as age, jurisdiction, net worth band, or risk category-within a time-versioned datastore (114d). This storage schema supports historical and regulatory audit trails, compliance reviews, and analytics without ever compromising individual user identities.

Figure 6:
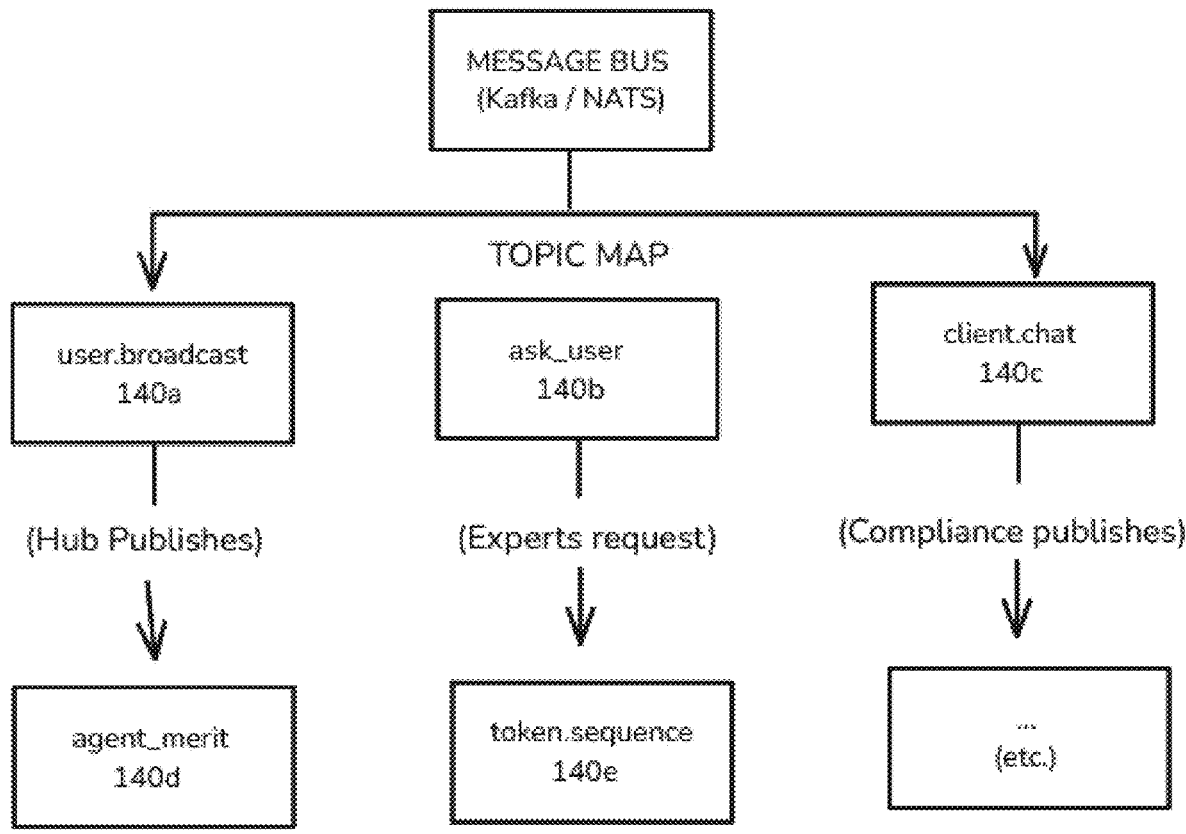
FIG. 6 is a schematic diagram showing message bus topic segmentation and the anonymized envelope structure utilized for inter-pod communication.

Following preprocessing, the Conversation Hub publishes an anonymized envelope onto a decentralized, event-driven message bus (140, schema detailed in FIG. 6). Each envelope is deliberately minimalistic, containing only hashed conversation IDs (602), anonymized sender or target IDs (604), non-sensitive profile data slices (606), and sanitized payload content (608). Optionally included are confidence scores (610) and compliance policy tags (612), inserted by downstream components.

Each Domain Expert Pod (122, 124, 126-FIG. 1) autonomously subscribes to this message bus. Expert pods independently assess message relevance via an internal Relevance Classifier (202, FIG. 2) leveraging domain-specific ontology matching. Irrelevant envelopes are silently discarded, efficiently conserving computational resources.

Upon affirming relevance, expert pods perform completeness checks through a Missing Data Evaluator (204). When critical profile attributes are unavailable, pods issue structured data requests over a dedicated ask_user channel (140b), initiating a privacy-preserving data handshake. The Conversation Hub (110) relays these requests to users, securely captures the user's replies, enriches stored profile data, and republishes updated envelopes onto the broadcast channel (140a). Crucially, this data acquisition cycle involves no downstream exposure of raw personal identifiers (illustrated clearly in FIG. 4).

Once a pod confirms sufficient data availability, it employs a specialized Reasoning Engine (206, FIG. 2) to construct an advisory response. The Reasoning Engine may utilize retrieval-augmented generation (RAG), rule-based logic, hybrid decision graphs, or equivalent reasoning methods. For scenarios requiring contextual document retrieval (FIG. 7), the engine uses a Retriever module (718) that queries a vector index (716). This vector index is populated through an ingestion pipeline consisting of an ingestion manager (710), document chunking component (712), and state-of-the-art embedding models (714). Frequently accessed embeddings may optionally be cached (720), optimizing real-time retrieval performance.

Draft responses then undergo rigorous compliance evaluation. A Compliance Pod (130, 132, 134—FIGS. 1 & 3) applies tenant-specific compliance rules dynamically loaded from configuration files (730, FIG. 9). A Rule Loader (732) monitors these policy configuration files, supporting instantaneous hot-swappable policy updates without container restart. The Policy Evaluator (304) executes these dynamically loaded compliance rules against the drafted response, ensuring that content meets all regulatory, institutional, or ethical standards. Responses failing compliance checks trigger structured user feedback via channel (140b), thereby enabling rapid, corrective user interaction. Approved responses carry optional policy version identifiers (738), ensuring transparency and auditability.

Figure 11:
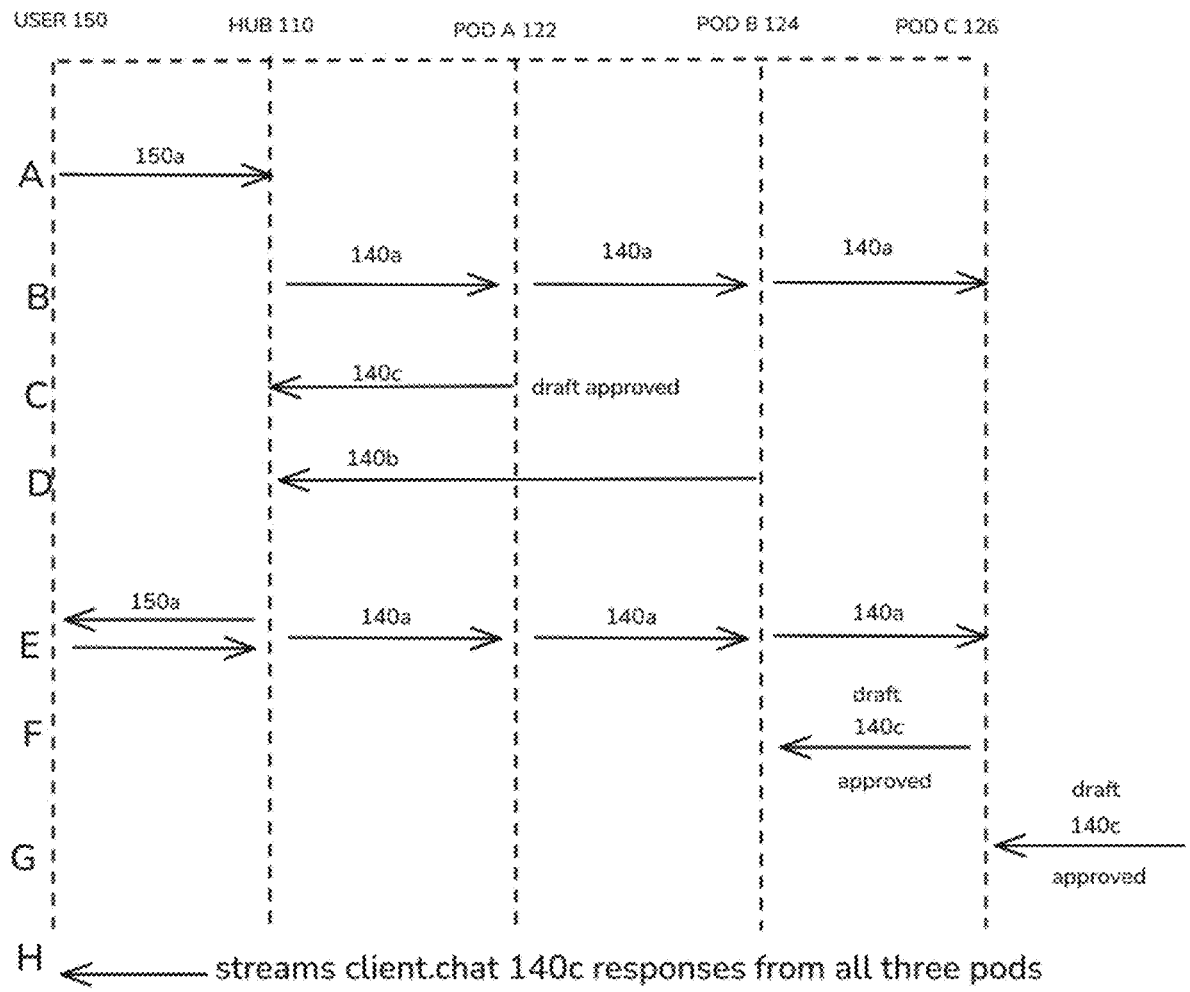
FIG. 11 is a sequence diagram depicting a multi-domain interaction, wherein multiple domain expert pods independently contribute distinct domain-specific responses to collectively form an integrated advisory response.

The approved, compliant responses subsequently reach the user via the client.chat channel (140c), where the client interface (150) streams and displays responses, each tagged according to its originating expert domain. FIG. 11 exemplifies this decentralized, self-coordinated interaction, illustrating how multiple domain experts autonomously contribute to a coherent and integrated advisory solution without centralized orchestration, explicitly preserving both privacy and compliance throughout the entire conversational lifecycle.

Optional system governance capabilities further enhance the invention's flexibility and efficiency. For instance, Domain Expert Pods can optionally publish confidence metrics to an agent merit ledger (720, FIG. 8), enabling analytical scoring, pod-quality governance, and intelligent scaling decisions. Likewise, a lightweight Token Dispatcher (800, FIG. 8) can coordinate exclusive publishing turns via a dedicated token-sequence channel (140e), enhancing conversational coherence without centralized control or data access violations.

The complete operational environment (FIG. 10) executes within an elastic, cloud-native container orchestration cluster (930). Workloads including Profile DB (812), message bus services (814), vector indexing (816), and expert pods themselves are deployed in auto-scaling node pools (932), with static assets securely managed in object storage (934), cryptographic keys protected by key management services (936), and telemetry routed into audit logging services (938). Industry-standard inbound ACLs and network policies strictly enforce security isolation and compliance requirements.

This decentralized multi-agent architecture, herein provisionally designated "Federated Unified Worker Network" (FUWN), uniquely offers significant advantages over prior art: eliminating single points of privacy exposure, dynamically enforcing tenant-specific compliance at scale, efficiently utilizing compute resources, reducing latency, enabling instantaneous regulatory policy updates, and universally adapting to any regulated knowledge-intensive industry. Whether deployed for financial advisory, medical decision support, cybersecurity response, human resources compliance management, logistical optimization, or beyond, this invention stands as a demonstrably novel, non-obvious, highly practical, and urgently needed advancement in regulated knowledge-intensive artificial intelligence solutions.

DETAILED DESCRIPTION OF THE DRAWINGS

FIG. 1 is a system-level block diagram illustrating a privacy-gated, decentralized multi-agent artificial intelligence architecture according to an embodiment of the invention. A Conversation Hub (110) receives a raw user message (150a) from a client interface (U ser UI 150). Within the Conversation Hub (110), an NLP/Tone Module (112) performs initial natural language preprocessing, after which a PII Firewall and Profile DAO component (114) securely removes personally identifiable information (PII) and manages permissible user profile data. A Broadcast Publisher (116) then publishes a sanitized message envelope onto a user.broadcast channel (140a).

Multiple Domain Expert Pods (Pod A 122, Pod B 124, Pod C 126)—each specialized in distinct knowledge domains-subscribe independently to the user.broadcast channel (140a). Each expert pod autonomously evaluates its relevance and, upon determining both relevance and the availability of sufficient data, generates a draft response. Each draft response passes individually through its respective Compliance Pod (Compliance Pod A 130, Compliance Pod B 132, Compliance Pod C 134), which enforces domain-specific or tenant-specific compliance rules.

Compliance-approved responses are then emitted onto a dedicated client.chat channel (140c) and subsequently transmitted back to the User UI (150). If a Domain Expert Pod identifies insufficient data required to complete a response, it issues a structured request via an ask_user channel (140b). This request is received by a Follow-Up Relay (118) within the Conversation Hub (110), which forwards the question back to the User UI (150), securely captures the user's response, updates the stored profile data, and republishes a revised sanitized message envelope onto the user.broadcast channel (140a). This mechanism ensures a closed-loop information flow without downstream exposure of personally identifiable information.

Figure 2:
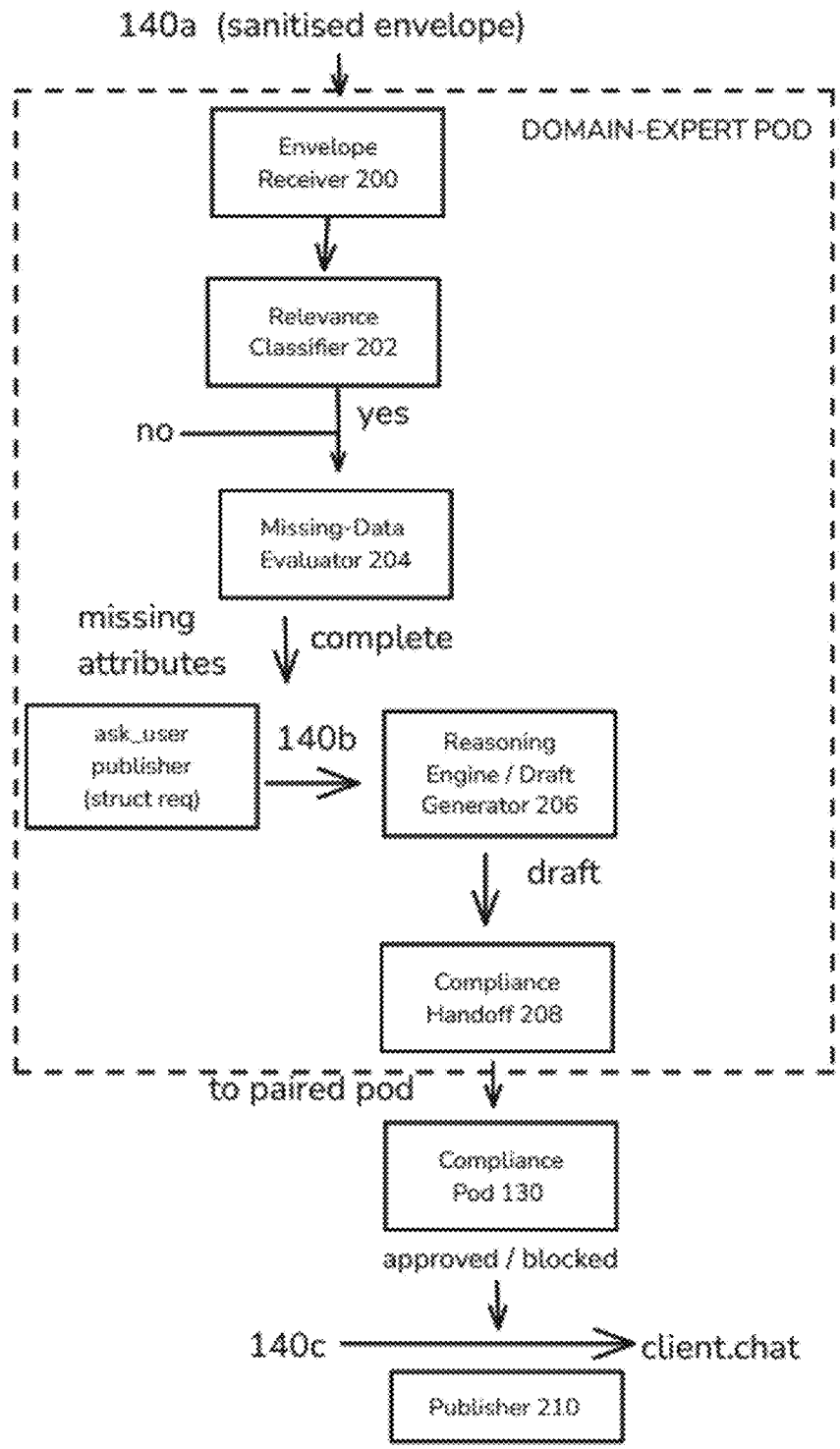
FIG. 2 is a flowchart illustrating the processes of autonomous relevance determination, solicitation of missing data, and generation of draft responses within a representative domain expert pod.

FIG. 2 depicts the internal workflow of a representative Domain Expert Pod. An anonymized message envelope arrives via the user.broadcast channel (140a) and is initially received by an Envelope Receiver (200). The received envelope is then forwarded to a Relevance Classifier (202), which autonomously evaluates whether the incoming content pertains to the specific knowledge domain of the pod. If the classifier determines the envelope irrelevant ("no"), processing for that envelope terminates at this step.

If the Relevance Classifier (202) confirms relevance ("yes"), the envelope proceeds to a Missing-Data Evaluator (204), which assesses whether the provided profile attributes satisfy the pod's required minimum data schema. If any required attribute such as jurisdiction, user preferences, or risk tolerance is identified as missing or incomplete, the Missing-Data Evaluator (204) issues a structured data request via the ask_user channel (140b). Processing then pauses until the Conversation Hub republishes an updated, enriched envelope back onto the user.broadcast channel (140a).

When the Missing-Data Evaluator (204) confirms all requisite data are complete, the envelope advances to a Reasoning Engine/Draft Generator (206). Depending on the embodiment, this component may employ retrieval-augmented generation methods, rules-based logic, decision trees, or hybrid reasoning algorithms to formulate a draft response along with an optional confidence score.

The generated draft response is then passed through a Compliance Handoff Interface (208) to the Compliance Pod (130) paired specifically with this Domain Expert Pod. If the Compliance Pod (130) approves the draft, the validated response proceeds to a Publisher (210), which subsequently transmits the compliance-approved content onto the client.chat channel (140c), making it immediately available to the user interface.

Thus, FIG. 2 clearly illustrates the internal logic whereby each Domain Expert Pod autonomously determines its relevance, manages data collection without breaching privacy constraints, generates domain-specific reasoning, and delegates compliance enforcement responsibilities to a dedicated, modular compliance sidecar, all without reliance on central orchestration.

Figure 3:
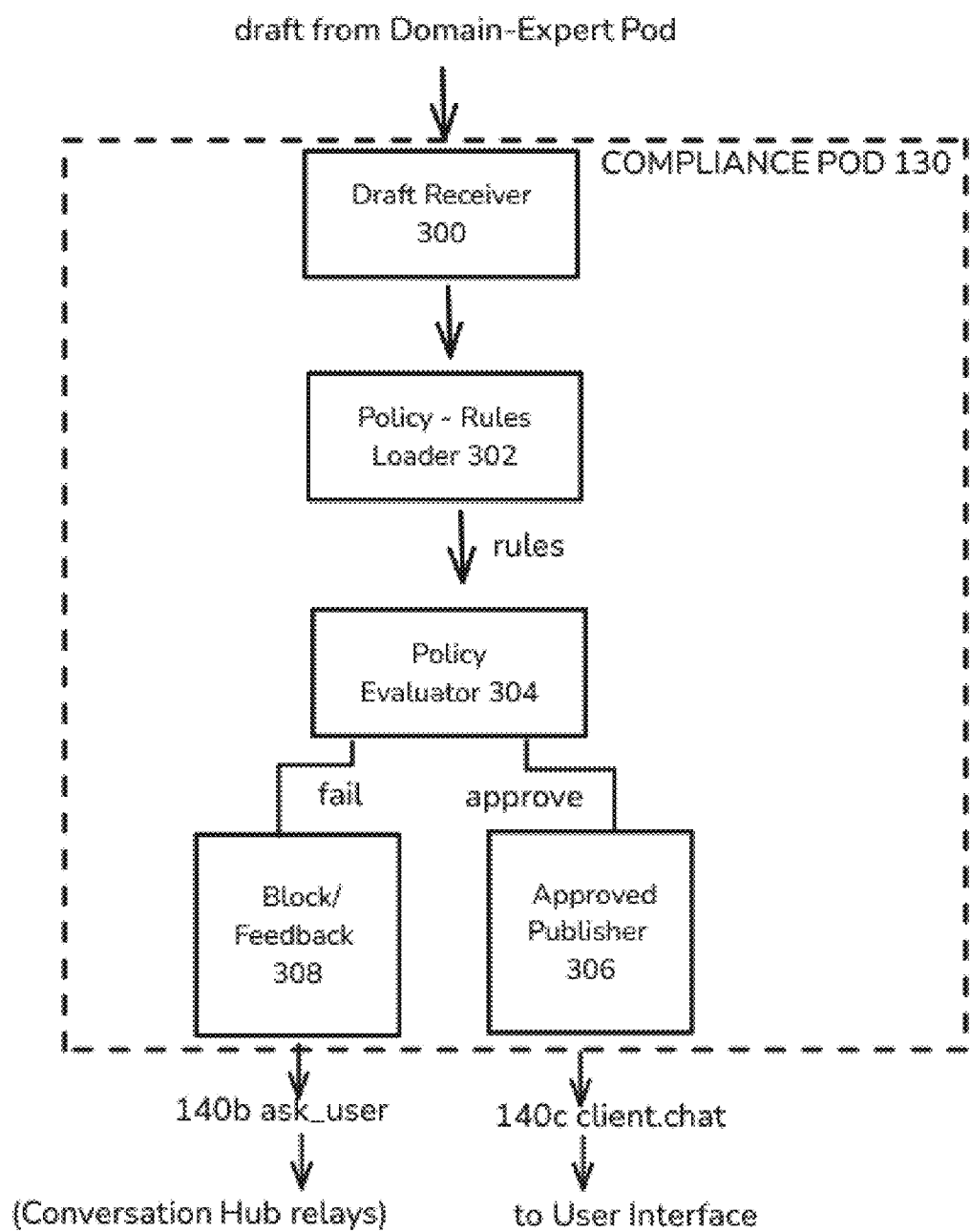
FIG. 3 is a flowchart depicting the evaluation of tenant-specific compliance policies and the resulting approval or rejection decision-making within a compliance pod associated with a domain expert pod.

FIG. 3 illustrates the internal workflow of a Compliance Pod (130), paired individually with a corresponding Domain Expert Pod. A draft response generated by the expert pod enters the Compliance Pod via a Draft Receiver (300). The received draft is then passed to a Policy Rules Loader (302), which retrieves a tenant-specific compliance configuration—for instance, a YAML-based policy file or a ruleset stored within object storage—and temporarily caches this configuration for evaluation purposes.

Subsequently, the Policy Evaluator (304) applies each compliance rule from the loaded configuration to the draft response. Examples of such rules include verification that necessary disclaimers are present, ensuring that all personally identifiable information (PII) tokens are removed or hashed, and confirming the inclusion of required statutory or regulatory citations. If any compliance check fails, the evaluator routes the response along the "fail" pathway to a Block/Feedback Publisher (308). This component generates a structured feedback message containing an error or failure code and, optionally, a clarifying prompt or instruction. The Block/Feedback Publisher (308) publishes this structured request to the ask_user channel (140b), enabling the Conversation Hub to relay relevant information back to the user for additional data or notification regarding policy violations.

If the evaluated draft successfully passes all compliance checks, control follows the "approve" path toward an Approved Publisher (306). This component directly emits the compliance-validated response onto the client.chat channel (140c). Notably, because the compliant responses flow directly to the user interface without passing through intermediate interception points (such as the Conversation Hub), the architecture ensures response integrity, minimal latency, and preserves the approved compliance status of the delivered content.

Accordingly, the design depicted in FIG. 3 enables modular, tenant-specific compliance enforcement, with dynamically configurable policy loading, ensuring that only responses that fully comply with configured policies reach end-users. Non-compliant responses are effectively managed via structured feedback loops, maintaining user interaction without compromising sensitive or protected data.

Figure 4:
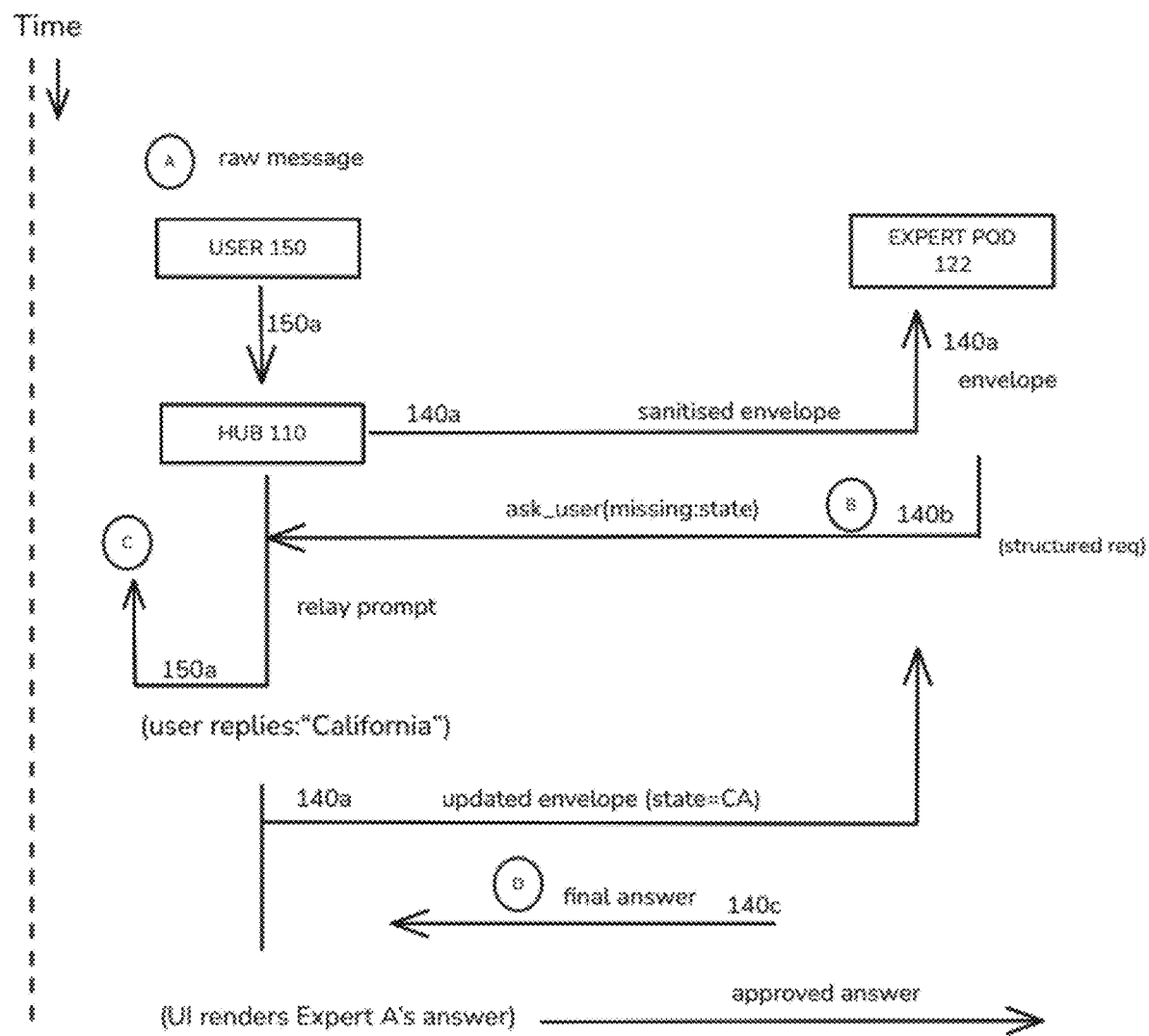
FIG. 4 is a timing diagram illustrating an event-driven handshake for requesting missing data mediated by the ask-user message bus channel between the Conversation Hub and a domain expert pod.

FIG. 4—Missing Data Handshake Timing Diagram—illustrates the event-driven handshake process initiated when a Domain Expert Pod requires additional profile information to generate a compliant response.

Step A: A user message enters the system from the User Interface (150), passing to the Conversation Hub (110) via link (150a). The Hub removes or hashes personally identifiable information (PII), stores permissible profile attributes securely, and publishes a sanitized envelope onto the user.broadcast channel (140a), accessible by subscribing agents.

Step B: Domain Expert Pod A (122), upon receiving the sanitized envelope from channel (140a), determines that required information (in this illustrative scenario, the user's "state") is absent. Consequently, it publishes a structured request—for example, {"missing":["state"]}—onto the ask_user channel (140b). This request contains only conversation identifiers and requested data keys, ensuring that no personal data exit the Conversation Hub's secured privacy boundary.

Step C: The Conversation Hub (110), subscribed to the ask_user channel (140b), relays this structured request back to the user via link (150a). Upon receiving the prompt, the user replies—for example, by providing the previously missing data attribute ("California"). This reply re-enters the Conversation Hub, which updates the user's stored profile data after hashing any new identifiers. The Hub then republishes an updated sanitized envelope containing the provided attribute (e.g., state=CA) onto the user.broadcast channel (140a).

Step D: Domain Expert Pod A (122), upon receiving the enriched envelope with complete profile information, confirms no further data gaps exist, executes its reasoning engine, and produces a draft response. This response undergoes compliance verification in its paired compliance pod (compliance verification flow not explicitly shown here). After compliance approval, the final answer is published onto the client.chat channel (140c) and transmitted back to the User Interface (150), completing the conversational exchange.

The timing diagram emphasizes several important features of this handshake mechanism:

(1) Sensitive user data acquisition occurs exclusively within the Conversation Hub, preventing direct access to personally identifiable information by Domain Expert Pods.

(2) The data retrieval handshake operates solely through event-driven messaging channels rather than relying on centralized orchestration.

(3) Multiple expert pods may independently and concurrently issue structured data requests without interference, as each envelope rebroadcast initiates a new autonomous relevance evaluation cycle.

(4) Latency remains bounded by a minimal number of message bus exchanges, supporting seamless conversational interaction while strictly adhering to privacy constraints.

Figure 5:
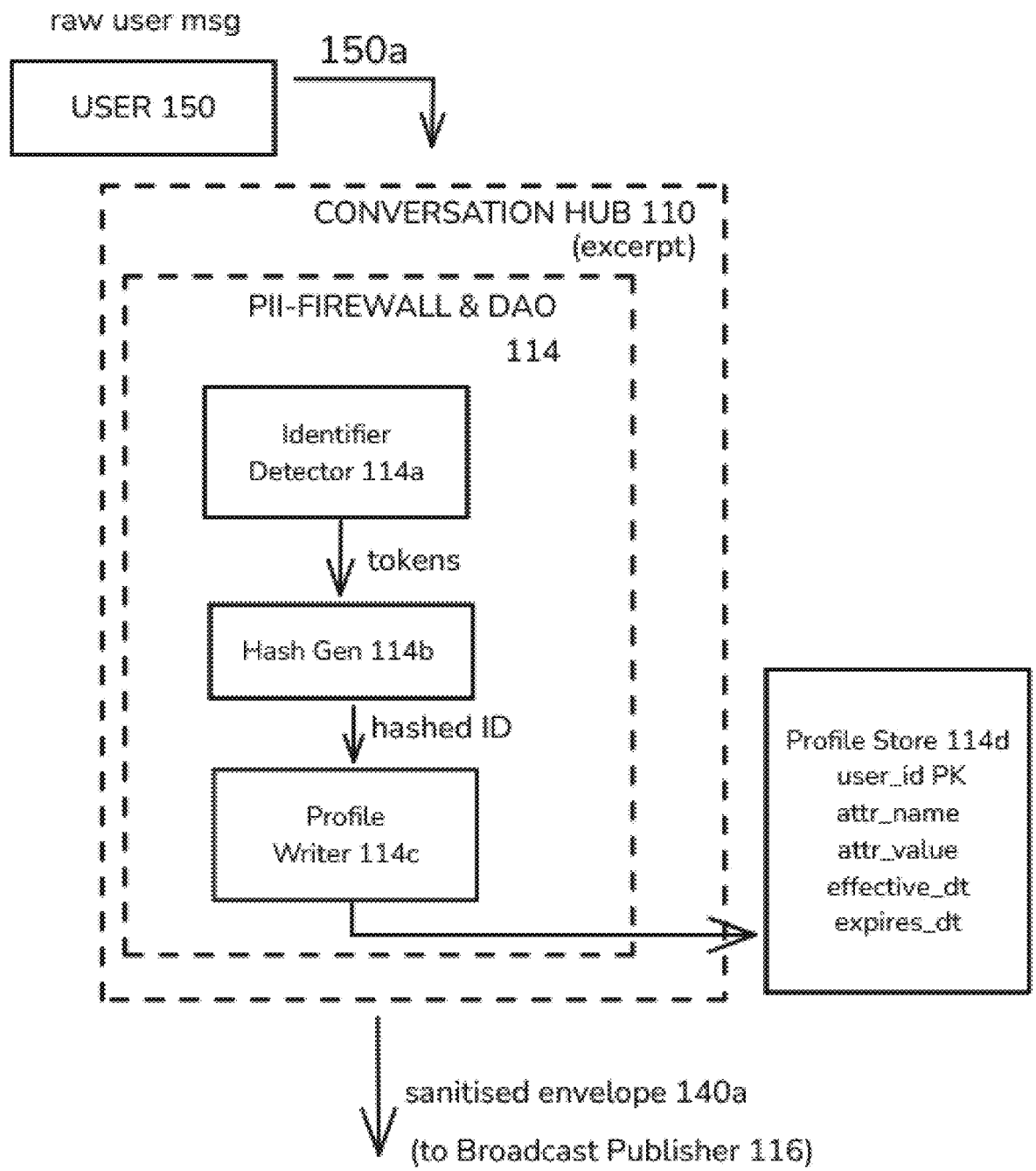
FIG. 5 is a block diagram illustrating a PII redaction firewall, which hashes direct identifiers, alongside a schema for securely storing profile attributes in a privacy-compliant datastore.

FIG. 5 illustrates the privacy-preserving processing pathway executed by the PII Firewall & DAO (114), residing within the Conversation Hub (110). Initially, a raw user message enters the system from User Interface (150) via link (150a). Upon receipt, the message is processed by an Identifier Detector (114a), which employs rule-based detection, such as regular expressions or named entity recognition, to identify direct identifiers (e.g., names, social security numbers, email addresses).

Detected identifiers ("tokens") are passed into a Hash Generator (114b), which replaces each original identifier with a deterministic, salted hash ("hashed ID"). Original identifiers are subsequently discarded to ensure no leakage of sensitive personal data downstream.

The Profile Writer (114c) component then securely stores permissible attributes alongside hashed identifiers into a structured Profile Store (114d). This datastore is implemented as a relational table schema comprising user_id (hashed identifier, primary key), attribute names (attr_name), attribute values (attr_value), effective date (effective_dt), and expiration date (expires_dt).

Finally, the firewall publishes a sanitized message envelope onto the user.broadcast channel (140*a*), accessible by downstream components such as the Broadcast Publisher (116, not explicitly shown here). This envelope utilizes hashed tokens exclusively as user identifiers, carrying only those attributes that successfully cleared privacy processing. By design, all personally identifiable information remains within the secure boundary of the Conversation Hub, ensuring compliance with regulatory standards such as GDPR, HIPAA, or equivalent data-protection statutes.

The modular design—Identifier Detector (114*a*), Hash Generator (114*b*), and Profile Writer (114*c*)—allows operators to independently update detection rules, hashing algorithms, or persistence logic without affecting downstream agent processing. Such modularity enables dynamic and flexible privacy policy management within the overall system architecture.

FIG. 6 illustrates logical segmentation of the message bus topics and the schema for the sanitized message envelopes exchanged among components.

The message bus is logically partitioned into five primary topics. The user.broadcast topic (140*a*) carries sanitized envelopes published by the Conversation Hub following PII redaction. The ask_user topic (140*b*) conveys structured requests from Domain Expert Pods for missing user profile attributes back to the Conversation Hub. The client.chat topic (140*c*) transports responses approved by compliance modules, destined directly for rendering at the user interface. Two optional topics, agent_merit (140*d*) and token.sequence (140*e*), respectively facilitate real-time scoring of agent performance and coordination of token-passing between expert pods.

Inset in FIG. 6 is the anonymized envelope schema (600), representing the minimal structure of inter-component messages. Each envelope includes a unique conversation identifier (conv_id 602) linking all messages within the same user session. The envelope further contains the identifier (agent_id 604) specifying the originating or target pod, a privacy-filtered set of profile attributes (profile_slice 606) approved by the PII firewall, and the primary content payload (payload 608), which may hold the user's sanitized inquiry, an expert pod's draft response, or a structured missing-data request, depending on the envelope's topic channel.

Optionally, the envelope can also include a confidence score (confidence 610) generated by the pod's reasoning engine and a compliance policy indicator (policy_tag 612) specifying the compliance rule set that authorized the content.

Logical separation into defined topics, coupled with a minimal, hashed envelope schema, ensures data isolation between pods, facilitates horizontal scaling of new expert domains, and provides an immutable audit trail, reinforcing robust privacy controls and facilitating regulatory compliance.

Figure 7:
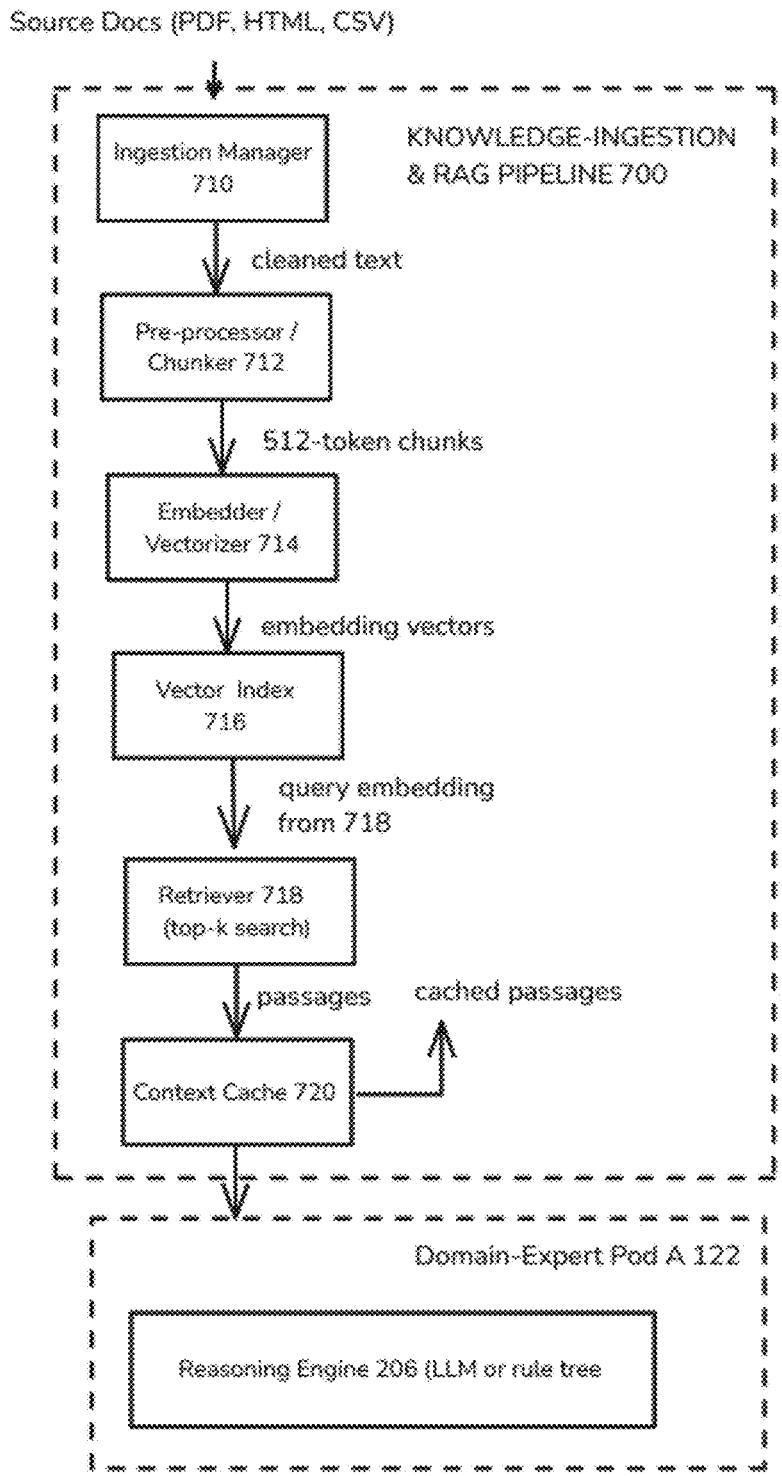
FIG. 7 is a block diagram illustrating a knowledge ingestion and retrieval-augmented generation pipeline, which embeds source documents into a vector-based index.

FIG. 7 illustrates the Knowledge Ingestion and Retrieval-Augmented Generation (RAG) Pipeline (700) responsible for providing authoritative contextual information to each Domain Expert Pod. Initially, external source documents (such as but not limited to PDF, HTML, or CSV files containing industry regulations, policy statements, or research documents) are ingested by a Document Ingestion Manager (710), which normalizes formats and prepares documents for further processing.

Normalized and cleaned text passes through a Pre-processor/Chunker (712), segmenting the text into controlled-length passages (e.g., approximately 512 tokens each) and associating these passages with metadata, such as document title and publication date. These structured text chunks then enter an Embedder/Vectorizer (714) module, which transforms each passage into high-dimensional vector embeddings. The embedding process can leverage state-of-the-art techniques such as OpenAI text embedding models or Sentence-BERT (SBERT).

Generated embedding vectors, along with associated metadata, are stored in a Vector Index (716), for example, using a managed vector database (such as but not limited to Pinecone®) optimized for efficient nearest-neighbor searches. During runtime, when a user query is processed, the Retriever component (718) receives a query embedding from the Reasoning Engine (206) of the Domain Expert Pod (122) and executes a top-k similarity search against the stored embeddings to identify the most contextually relevant passages.

Optionally, frequently accessed or highly relevant passages retrieved during runtime may be cached in a Context Cache (720) to reduce latency and resource usage in subsequent queries.

Finally, the Reasoning Engine (206) integrates the retrieved contextual passages into its reasoning algorithm—such as embedding them within a prompt for a Large Language Model (LLM) or evaluating them through a rule-based decision tree—to generate a draft response. This draft response subsequently undergoes compliance processing as illustrated in FIGS. 2 and 3.

By embedding context from authoritative and up-to-date domain-specific documents, the pipeline effectively enhances each Domain Expert Pod's reasoning capabilities while preserving the decentralized, privacy-oriented principles integral to the described architecture.

Figure 8:
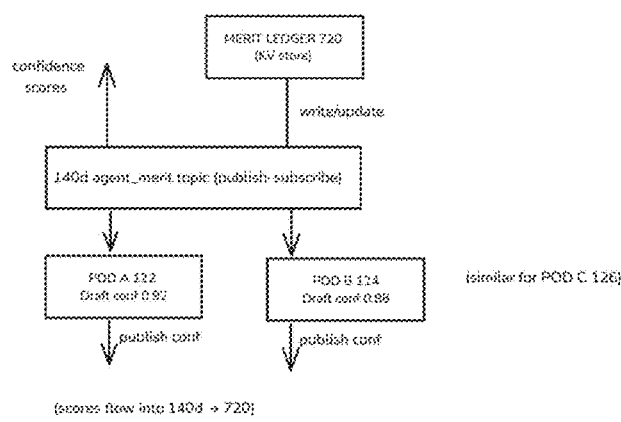
FIG. 8 is a schematic diagram illustrating a merit ledger used to record confidence scores, along with an optional token-passing coordination channel between domain expert pods.
Figure 8:
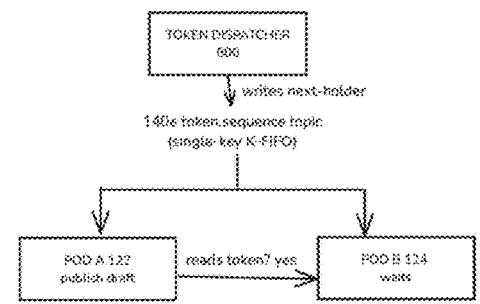

FIG. 8 illustrates merit ledger recording and token-passing coordination mechanisms among Domain Expert Pods.

Left panel (FIG. 8.*a*) depicts the Merit Ledger Flow. Each Domain Expert Pod (such as pods 122, 124, 126) can include functionality enabling it to append a confidence score to each generated response intended for the user interface. After a Compliance Pod approves a response, the corresponding expert pod emits a structured MERIT message—including, but not limited to, fields such as conversation identifier, agent identifier, and confidence score—onto the dedicated agent_merit topic (140*d*). A background consumer listens to topic 140*d* and updates a Merit Ledger datastore (720), which may be implemented, for example, as a key-value store. This datastore can track metrics such as rolling averages, cumulative scores, or timestamps associated with pod performance.

Applications of the merit ledger datastore (720) may include, without limitation:

Automatic downgrading or de-prioritization of pods whose recent performance (as indicated by confidence scores) drops below configurable thresholds.

Analytical tracking of domains frequently requesting supplemental data from users.

Billing or cost allocation based on quality contributions, rather than strictly message volume.

This modular scoring mechanism, utilizing a dedicated message bus topic (140*d*), operates independently without altering primary message flows described in FIGS. 1-4.

Right panel (FIG. 8.*b*) illustrates an optional Token Passing Coordination mechanism, suitable for deployments where exclusivity is desired-such as scenarios where simultaneous or conflicting recommendations (e.g., asset allocation advice) must be avoided. A stateless Token Dispatcher (800) assigns turn-taking control by writing the next holder identifier into a token.sequence topic (140e), which can be managed using various strategies, such as round-robin rotation or merit-weighted scheduling.

Each Domain Expert Pod (e.g., Pods 122, 124) subscribes to the 140e topic. Pods draft and publish their responses only when the token.sequence contains their own identifier (agent_id). After publishing a response or after a configurable timeout period, the pod relinquishes the token by writing the next holder's identifier back onto topic 140e.

This lightweight token-passing coordination scheme achieves exclusive message publishing without necessitating a centralized orchestrator component. The dispatcher (800) itself remains stateless and does not inspect or alter conversational content, thereby maintaining system decentralization and data privacy.

Together, these two coordination approaches-merit-based performance tracking and fair turn-taking—demonstrate optional governance capabilities layered upon the decentralized, privacy-preserving core message-bus architecture described herein, without introducing hierarchical routing complexity or compromising sensitive data boundaries.

Figure 9:
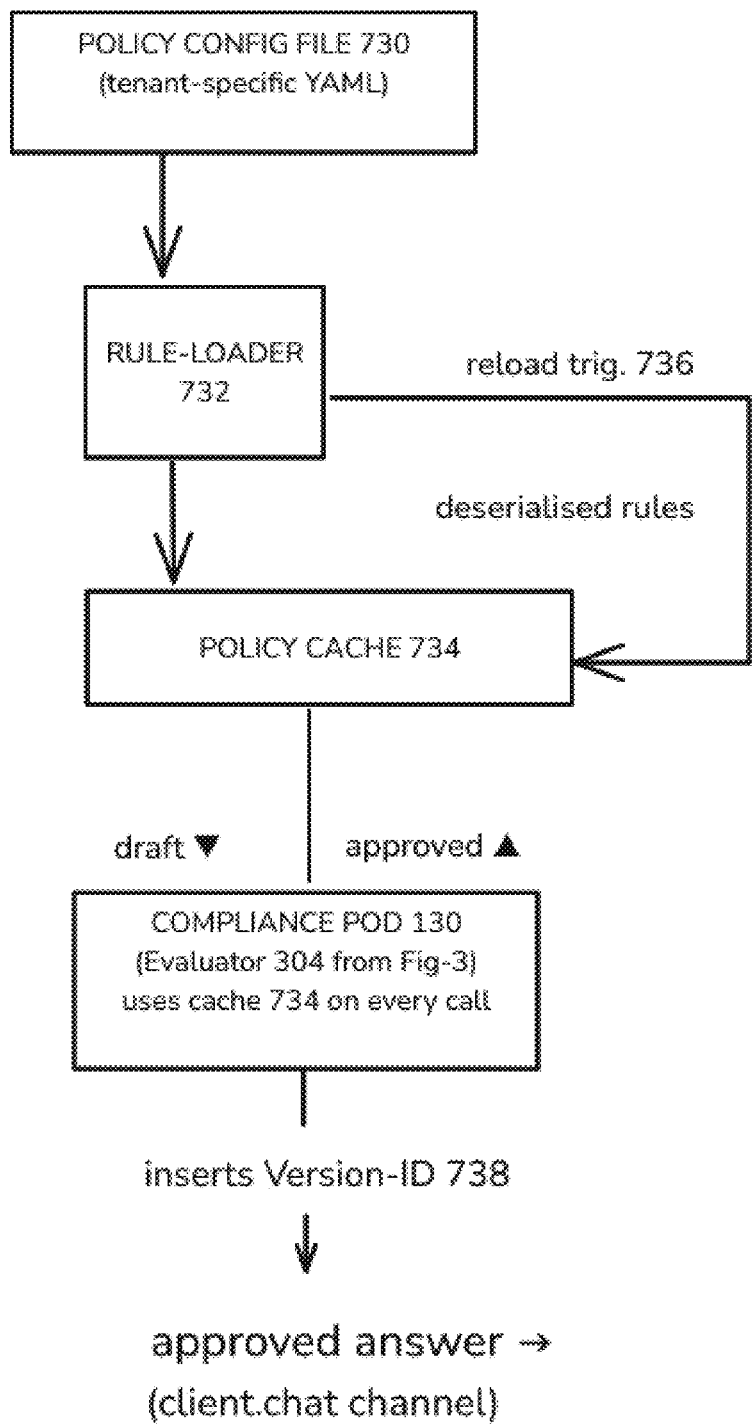
FIG. 9 is a block diagram illustrating a dynamically configurable compliance rule loader, enabling live updates to compliance policies without necessitating redeployment of the associated expert pod.

FIG. 9 illustrates a compliance-rule loading mechanism that enables dynamic ("hot-swappable") updates to tenant-specific compliance policies without requiring redeployment of associated Domain Expert Pods.

Initially, a tenant-specific Policy Configuration File (730)—for example, a YAML-formatted file—resides either in external object storage or on a mounted volume accessible to the Compliance Pod. A lightweight Rule Loader module (732) monitors this file path continuously. When a change event occurs, signaled by a file-watch trigger (736), the Rule Loader deserializes the updated rules and writes them directly into an in-memory Policy Cache (734) within the Compliance Pod (130).

A Policy Evaluator component (304, depicted earlier in FIG. 3) accesses this Policy Cache (734) during every draft response evaluation, allowing immediate, seamless adoption of policy updates. Because the evaluator itself does not directly interact with the file system, the pod can dynamically apply new compliance rules without restarting or redeploying its associated container.

Optionally, upon approving a draft response, the Policy Evaluator (304) may attach a Version-ID header (738) referencing the specific policy ruleset version that validated the content. This facilitates precise auditing and traceability of policy compliance by external reviewers or auditors.

The described "hot-swap" capability is particularly advantageous in regulated contexts—such as, but not limited to, finance, healthcare, or legal advisory—where compliance rules and standards frequently evolve. For example, regulatory updates issued by authorities (such as SEC rule changes, GDPR amendments, or firm-specific ethical exclusions) can be rapidly implemented by compliance personnel by simply replacing the YAML configuration file. This modular design clearly separates compliance logic updates from expert domain logic, ensuring flexibility, rapid policy deployment, and strong regulatory compliance without impacting the ongoing operations of domain-specific logic in expert pods.

FIG. 10 illustrates a representative container-level deployment architecture suitable for implementing the described invention in a cloud-native or containerized environment.

Incoming HTTPS traffic originating from a client-facing web application (Client Web-App 842) is initially terminated at an Ingress Gateway (840). Authenticated requests received by this gateway are subsequently forwarded via internal protocols such as gRPC or REST into the Kubernetes (or equivalent container orchestration) cluster boundary.

Within this containerized environment, requests enter a Conversation-Hub Pod (810), responsible for preprocessing user interactions, sanitizing personally identifiable information (PII), and securely managing user profile attributes. Profile attributes deemed permissible are persisted into a dedicated database, exemplified here by a PostgreSQL-based Profile-DB Pod (812).

Following profile management, the Conversation-Hub Pod (810) publishes sanitized message envelopes onto a cluster-internal message bus, exemplified by Kafka (Kafka Bus 814). A series of Domain Expert Pods (Pod A 820, Pod B 824, Pod C 828) independently subscribe to this Kafka bus to autonomously select relevant envelopes. Each Domain Expert Pod is accompanied by a Compliance Pod sidecar (822, 826, 830) enforcing domain—or tenant-specific compliance rules. Network-policy controls ("network-policy fence") ensure strict isolation and compliance checking of all outbound messages, explicitly disallowing direct egress to external internet services from the Expert Pods.

Domain Expert Pods (820, 824, 828) query a dedicated Vector Index Pod (816) to support retrieval-augmented generation (RAG) capabilities, ensuring their responses integrate relevant and authoritative contextual data.

Optionally, the deployment may also include service-mesh infrastructure components, enabling mutual TLS, enforcing least-privilege networking rules, and providing observability and secure inter-pod communication.

The described architecture inherently supports modularity and flexibility. Pods can be horizontally scaled independently, compliance rules dynamically updated via configuration-volume mounts (see FIG. 9), and retrieval-augmentation technologies (Vector Index Pod 816) replaced or upgraded without altering the central Conversation Hub (810) or compromising the established privacy and compliance boundaries. This modular and fault-isolated design facilitates robust scalability, cloud-native operability, and regulatory compliance across diverse operational environments and industry domains.

FIG. 11 illustrates the interaction sequence among multiple independent Domain Expert Pods collaboratively providing an integrated advisory response, while strictly maintaining privacy controls and compliance enforcement.

At step A, a user submits a query via the User Interface (150). The message reaches the Conversation Hub (110) through channel (150a). The Hub sanitizes the message, removing personally identifiable information (PII), and then publishes a sanitized envelope onto the user.broadcast topic (140a).

At step B, Domain Expert Pod A (122) autonomously evaluates its relevance based on the envelope content, determines it has sufficient data, and drafts a response.

At step C, Pod A's draft response is approved by its paired Compliance Pod (130, described previously), after which it is published back to the user via the client.chat channel (140c).

At step D, Domain Expert Pod B (124) also self-selects relevance, but determines additional profile data is required. Pod B issues a structured data request via the ask_user channel (140b).

At step E, the Conversation Hub (110) relays Pod B's structured data request to the user interface (150) through channel (150a). Upon receiving the user's response, the Hub securely updates the user profile and republishes an enriched, sanitized envelope onto the user.broadcast channel (140a). Expert pods then autonomously reassess this updated envelope, allowing Pod B to proceed with complete data.

At step F, Pod B drafts its response, receives compliance approval from Compliance Pod B (132, described previously), and publishes the approved response back to the user via channel (140c).

At step G, Domain Expert Pod C (126) evaluates the enriched envelope along with prior approved responses, ensuring all interdependencies are satisfied. Pod C generates a comprehensive advisory recommendation, obtains approval from Compliance Pod C (134, described previously), and publishes the finalized response onto (140c).

At step H, the User Interface (150) receives and displays these distinct advisory responses from multiple pods, demonstrating decentralized expert collaboration without central orchestration. Any subsequent user questions restart this privacy-protected, compliance-enforced advisory cycle.

This sequence demonstrates how multiple domain-specific expert pods autonomously coordinate through event-driven messaging, collaboratively resolving complex user inquiries while strictly enforcing data privacy and regulatory compliance.

FIG. 12 illustrates an example computing environment suitable for deploying the decentralized artificial intelligence architecture described herein.

End users interact with the system through client interfaces, such as a mobile device (902) or desktop browser (904). These devices initiate secure HTTPS sessions (900a, 900b) traversing the public Internet (910). Enterprise or internal users optionally route traffic through secure VPN tunnels (912).

Inbound requests are initially screened by an edge firewall (914), then forwarded via a load balancer or API gateway (920) managed by a cloud provider or hosting environment. Traffic subsequently passes through an inbound security group (922) configured to expose only essential communication ports and protocols to the internal container orchestration cluster (930).

The container cluster (930) hosts workload pods previously described in detail (see FIG. 10), including—but not limited to—Conversation Hub, domain expert pods, compliance pods, message bus infrastructure, vector indexing services, and profile databases. These workload pods are distributed across scalable node pools (932), enabling automatic scaling according to operational demands.

Static artifacts, such as compliance policy configuration files (YAML format) and domain-specific documents for knowledge ingestion, are stored securely in an object storage service (934). Sensitive data, including encryption keys, API credentials, and other confidential configuration parameters, reside within a secrets manager or dedicated key management service (936).

Cluster telemetry, pod-level operational metrics, and compliance-related audit events continuously stream into a monitoring and audit log service (938), providing real-time observability, event logging, and auditable records necessary for regulatory compliance verification and evidentiary retention.

All external service communications and data flows to and from the cluster employ private networking connections or service mesh tunnels. These mechanisms ensure infrastructure-level compliance with the privacy and data-protection principles articulated earlier, preserving strong security and compliance guarantees across the entire computing environment.

This illustrative deployment environment demonstrates that the described architecture can be effectively implemented on standard cloud infrastructure platforms utilizing established security best practices and modular, cloud-native design patterns.

What is claimed is:

1. A system comprising: a conversation hub installed in a node, receiving user messages comprising personally-identifying information (PII), detecting and replacing each instance of the PII with a hashed identifier, and storing authorized attributes in a profile data store, and publishing an anonymized envelope on a publish-and-subscribe message bus;
 the publish-and-subscribe message bus configured for broadcasting each anonymized envelope to subscribers without centralized routing logic;
 a plurality of domain-expert pods, each configured for self-selecting relevant envelopes by applying a local relevance classifier, publishing a structured request for missing profile data when required data attributes are absent, retrieving contextual passages from a vector index using an embedding derived from the envelope payload, and generating a domain-specific draft response using a reasoning engine;
 a dedicated compliance side-car pod for each domain-expert pod configured for loading tenant-specific compliance policy files dynamically during runtime without restart, evaluating the domain-specific draft response against the loaded compliance policies, and publishing either a compliance-approved response or a rejection message onto a compliance message bus topic; and a user interface configured for subscribing to the compliance message bus topic and rendering exclusively compliance-approved responses to the user.

2. The system of claim 1, wherein the profile data store is a versioned datastore configured to record effective dates and expiry dates for each stored profile attribute.

3. The system of claim 1, wherein each hashed identifier is computed using an irreversible salted hash to prevent re-identification of the user.

4. The system of claim 1, wherein the local relevance classifier of each domain-expert pod is trained on a domain-specific corpus.

5. The system of claim 1, wherein the structured request for missing profile data is transmitted via a dedicated ask-user bus topic and securely relayed by the conversation hub to the user.

6. The system of claim 1, wherein the vector index is generated by an ingestion pipeline configured for segmenting domain documents into discrete chunks, computing embeddings for each chunk, and tagging each chunk with domain identifiers.

7. The system of claim 1, wherein the tenant-specific compliance policy files comprise rules expressed in a human-readable markup language that defines compliance patterns and associated actions.

8. The system of claim 7, wherein each compliance side-car pod appends a compliance policy version identifier to each approved response.

9. The system of claim 1, further comprising a merit ledger configured for maintaining rolling quality scores for each domain-expert pod based on confidence metrics published onto a governance message bus topic.

10. The system of claim 9, further comprising a token dispatcher configured for sequentially assigning publishing turns to domain-expert pods by publishing pod identifiers onto the governance message bus topic.

11. A computer-implemented method comprising: receiving, by a conversation hub, user messages comprising personally-identifying information (PII); replacing detected PII with hashed identifiers and storing authorized attributes into a secure profile data store; publishing an anonymized envelope onto a broadcast message bus; at each of a plurality of domain-expert pods, determining envelope relevance to a knowledge domain, publishing a structured request via a dedicated request channel when required profile data is missing, and upon receiving enriched profile data, retrieving contextual passages from a vector index and generating a draft response; evaluating the draft response via a compliance side-car pod against dynamically reloadable tenant-specific compliance policies; and publishing compliance-approved responses onto a client-visible message channel.

12. The method of claim 11, wherein determining envelope relevance occurs only if the envelope contains a confidence score exceeding a configurable threshold.

13. The method of claim 11, wherein the structured request specifies only missing profile attributes without including hashed identifiers.

14. The method of claim 11, wherein the compliance policy is configured to block responses containing recognized legal document templates.

15. The method of claim 11, further comprising updating compliance policies by placing a policy file in an object storage location monitored by the compliance side-car pod.

16. The method of claim 11, further comprising updating a merit ledger by recording confidence scores published by each domain-expert pod.

17. The method of claim 16, further comprising adjusting a relevance self-selection threshold for each domain-expert pod based on scores stored in the merit ledger.

18. The method of claim 11, wherein hashing methods, profile attribute handling, and message bus protocols are consistently structured across all domain-expert pods, enabling universal deployment across multiple knowledge domains.

19. A computer program product comprising a non-transitory computer-readable storage medium storing instructions that, when executed by one or more processors, cause the processors to perform operations comprising: receiving user messages containing personally-identifying information (PII); replacing detected PII with hashed identifiers and securely storing authorized profile data; publishing anonymized envelopes onto a decentralized message bus; at each of a plurality of domain-expert pods, determining envelope relevance to a knowledge domain, publishing structured requests for missing required profile attributes, and upon receiving enriched profile data, retrieving contextual passages from a vector index and generating draft responses; evaluating draft responses through compliance side-car pods against tenant-specific compliance policies that are reloadable during runtime without pod restarts; and publishing compliance-approved responses onto a client-visible communication channel.

20. The computer program product of claim 19, wherein the instructions further comprise dynamically reloading tenant-specific compliance policies into compliance side-car pods without service interruption.

21. The computer program product of claim 19, wherein the instructions further comprise publishing governance messages containing pod-specific merit scores onto a governance message bus topic.

* * * * *